US005666475A

United States Patent [19]
Salesin et al.

[11] Patent Number: 5,666,475
[45] Date of Patent: Sep. 9, 1997

[54] METHOD AND SYSTEM FOR EDITING MULTIRESOLUTION IMAGES AT FRACTIONAL-LEVELS OF RESOLUTION USING A WAVELET REPRESENTATION

[75] Inventors: David H. Salesin; Deborah F. Berman; Jason T. Bartell, all of Seattle, Wash.

[73] Assignee: University of Washington, Seattle, Wash.

[21] Appl. No.: 368,216

[22] Filed: Jan. 3, 1995

[51] Int. Cl.$^6$ .................................................. G06T 11/80
[52] U.S. Cl. ................................................................. 345/428
[58] Field of Search ........................... 395/128, 131, 395/133, 135, 139; 345/153, 132, 113; 382/240, 299, 298, 284

[56] References Cited

U.S. PATENT DOCUMENTS

| | | | |
|---|---|---|---|
| 4,692,806 | 9/1987 | Anderson | 348/399 |
| 5,122,873 | 6/1992 | Golin | 382/240 X |
| 5,262,958 | 11/1993 | Chui et al. | 364/487 |
| 5,276,786 | 1/1994 | Long et al. | 395/128 |
| 5,347,479 | 9/1994 | Miyazaki | 364/725 |
| 5,384,725 | 1/1995 | Coifman et al. | 364/807 |
| 5,394,523 | 2/1995 | Harris | 395/131 X |
| 5,418,894 | 5/1995 | Kitamura et al. | 395/131 |
| 5,461,493 | 10/1995 | Venable | 358/520 |
| 5,467,441 | 11/1995 | Stone et al. | 395/133 |
| 5,469,536 | 11/1995 | Blank | 395/131 |
| 5,471,568 | 11/1995 | Webb et al. | 395/133 |
| 5,473,737 | 12/1995 | Harper | 395/131 |
| 5,483,296 | 1/1996 | Nonweiler | 382/298 X |
| 5,488,674 | 1/1996 | Burt et al. | 382/284 |
| 5,495,292 | 2/1996 | Zhang et al. | 348/397 |
| 5,511,155 | 4/1996 | Yamaguchi | 395/133 |
| 5,563,960 | 10/1996 | Shapiro | 382/239 |

OTHER PUBLICATIONS

Microsoft Press, Computer Dictionary, 1994, p. 234 1994.
Liu, Towards Lazy Evaluation, Sharing and Non–Determinism in Resolution Based Functional Logic Languages, ACM Conference on Functional Programming Languages and Computer Architecture, Jun. 1993, pp. 201–209 Jun. 1993.
Cody, The Fast Wavelet Transform, Dr. Dobb's Journal, Apr. 1992 Apr. 1992.
Moulin, An Adaptive Finite Element Method for Image Representation, Pattern Recognition, Jul. 1992, pp. 70–74 Jul. 1992.
Lacroix, The Primary Raster: A Multiresolution Image Description, Pattern Recognition, Jun. 1990, pp. 903–907 Jun. 1990.
Li et al., Quantitative Evaluation on Edge Preservation in Multiresolution Images, Image Processing and Its Applications, Jul. 1989, pp. 623–627 Jul. 1989.
Texture Classification with Tree Structured Wavelet Transform, Pattern Recognition 1992 11th Intl Conf vol. II, pp. 256–259 Aug. 1992.
Texture Analysis and Classification with Tree–Structured Wavelet Transform, IEEE Transactions on Image Processing, pp. 429–441 Oct. 1993.

(List continued on next page.)

*Primary Examiner*—Anton W. Fetting
*Attorney, Agent, or Firm*—Seed and Berry LLP

[57] ABSTRACT

A method and apparatus for editing an image having different levels of resolution in different places. The method has the steps of inputting data representing the image, displaying at least a portion of the image at a fractional-level between the levels of resolution. The method also has the steps of editing the image at the fractional-level of resolution, updating the image to create an edited version of the image, storing the edited version of the image, and outputting the edited version of the image.

30 Claims, 6 Drawing Sheets

OTHER PUBLICATIONS

Multiscale Video Representation Using Multiresolution Motion Compensation and Wavelet Decomposition, IEEE Journal on Selected Areas in Communications, pp. 24–35 Jan. 1993.

Berman, Deborah F. et al., *Multiresolution Painting and Compositing*, Technical Report 94–01–09, University of Washington, Jan., 1994.

Perlin, Ken and Luiz Velho, *A Wavelet Representation for Unbounded Resolution Painting*, Technical Report, New York University, Nov., 1992.

METHOD AND SYSTEM FOR EDITING MULTIRESOLUTION IMAGES AT FRACTIONAL-LEVELS OF RESOLUTION USING A WAVELET REPRESENTATION

TECHNICAL FIELD

The invention relates to a method and apparatus for editing images, and more particularly, to a method and apparatus for editing images having different resolutions.

GOVERNMENT FUNDING

This invention was made with government support under Grant No. CCR-9357790, awarded by the National Science Foundation and with support from Air Force Award No. 80-9307. The government has certain rights in the invention.

BACKGROUND OF THE INVENTION

Editing displayed images by "painting" them or performing a similar type of operation has been done for some time. For example, the painting of multiresolution images is discussed by Perlin and Velho in "A Wavelet Representation for Unbounded Resolution Painting," *Technical Report*, New York University, November, 1992. The report describes the use of a multiresolution tree structure to implement an unbounded resolution paint system. The report also describes the use of wavelets to make it feasible to quickly propagate changes at multiple resolutions. However, the system discussed by Perlin and Velho does not support fractional-level (continuous) zooming into an image at an arbitrary resolution to enable a user to edit at any convenient scale. The system of Perlin and Velho also does not address the simplification of a variety of compositing operations when extrapolating the changes made at a course resolution level to a higher resolution level of the image. Finally, the system discussed in Perlin and Velho is limited to a standard wavelet basis.

SUMMARY OF THE INVENTION

It is an object of the invention to provide fractional-level "continuous" zooming in order to allow a user to display and edit portions of a multiresolution image at an arbitrary size.

Yet another object is to use lazy evaluation in compositing operations to simplify and "speed up" the process of editing an image.

In one aspect the present invention relates to a method of displaying and editing an image, which has discrete levels of resolution, at fractional levels of resolution thereof. The fractional levels lie anywhere in between the discrete levels. The editions made at the fractional-level resolution are stored in a foreground buffer and are updated by rescaling the editions to the next highest discrete level of resolution. The modified foreground buffer is then combined with a background buffer, which contains the image prior to any editions, and results in a composited image. The composited image is then propagated to a selected one of the discrete resolutions from its present resolution, by decomposing the composited image to all the lower levels of resolution and extrapolating the composited image to a higher level of resolution using lazy evaluation.

The image, which has a number of discrete levels of resolution, can be represented by a quadtree structure. Here, each of the levels of resolution has a corresponding level on the quadtree structure, and each level on the quadtree structure has a plurality of nodes. When an edition is made to the image, which changes all the edited nodes to a different color/transparency or erases all the opacity of the edited nodes, a simplified form of extrapolation can be used to propagate these changes. This is accomplished by multiplying the edited node transparency with the nodes occupying the level of the quadtree corresponding to the new resolution level.

Still other objects and advantages of the present invention will become readily apparent to those skilled in this art from the following detailed description wherein the preferred embodiment of the invention has been shown and described, simply by way of illustration of the best mode contemplated at the time of carrying out the invention. As will be realized, the invention is capable of other and different embodiments, and its several details are capable of modifications in various obvious respects, all without departing from the invention. Accordingly, the drawings and descriptions are to be regarded as illustrative in nature, and not as restrictive.

DETAILED DESCRIPTION OF THE INVENTION

Figure 1:
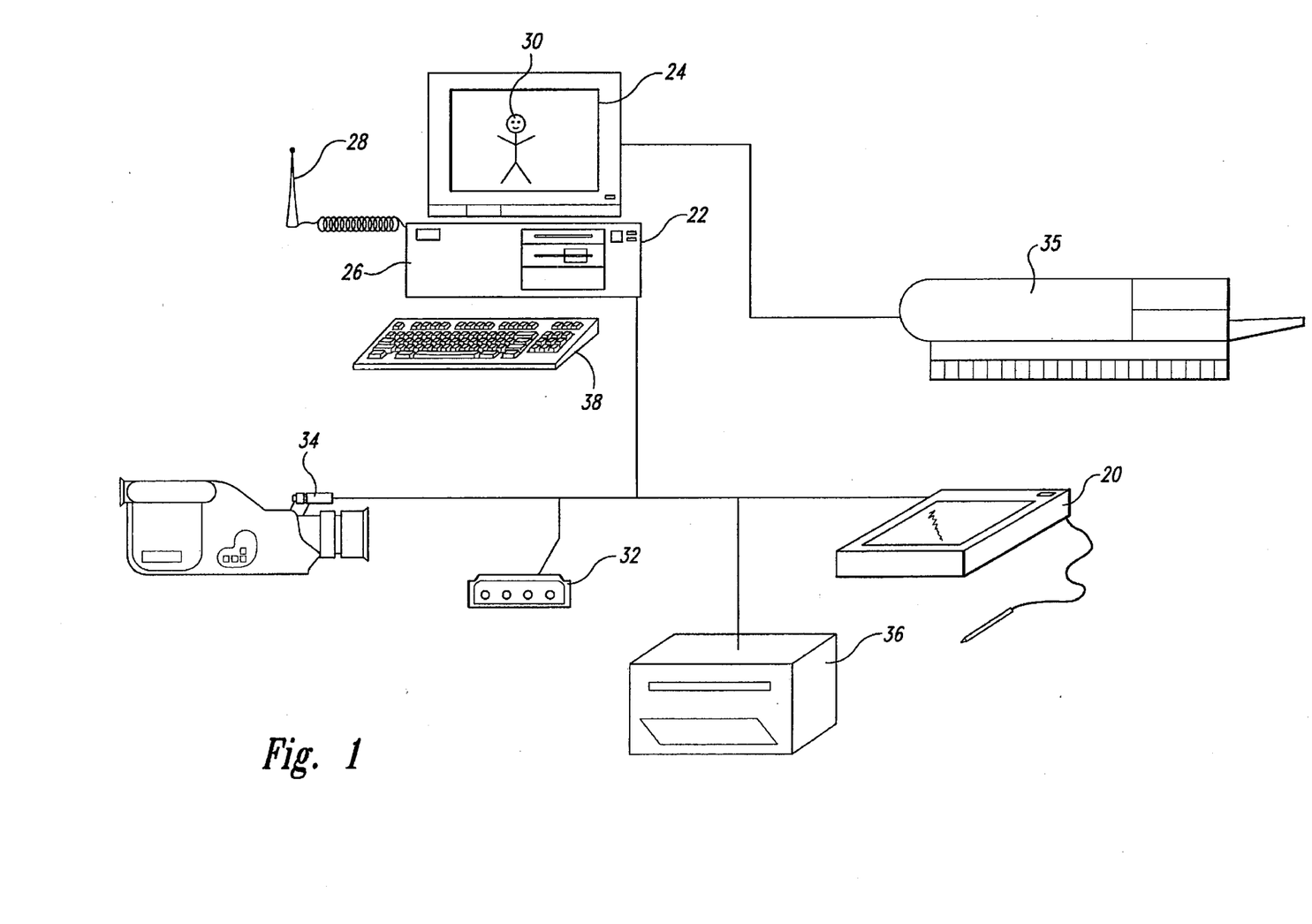
FIG. 1 shows a system for displaying and editing images at various resolutions.

FIG. 1 shows an acceptable apparatus for carrying out the method of the present invention. The apparatus includes input devices such as graphics pad 20, video input 34, and scanner 36, as well as a computer 22. The computer 22 includes a visual display unit 24, an electronic portion 26 having a CPU and a memory, a zooming device 38 (keyboard or sensor on display 24) and a paintbrush 28. The apparatus of FIG. 1 can be used to carry out the processes of the present invention. For example, the apparatus of FIG. 1 is useful for carrying out the process of fractional-level zooming to any selected resolution of an image 30 displayed on visual display unit 24 by using zooming device 38, and then editing a selected area of the image 30 at that fractional-level resolution using paintbrush 28. The apparatus can then extrapolate the editions of the image 30 to a lower resolution level using a simplified procedure.

The paintbrush 28 in the apparatus of FIG. 1 can be used to edit the image 30 in a variety of ways. For example, the paintbrush 28 can be used to remove paint from the image 30, or place paint on the image 30. The paintbrush 28 may also be used to apply paint on the image 30 only where paint has already been applied to the background of the image. Further, the image may be edited by placing paint on the image 30 only where it is applied by the paintbrush 28 and where the background of the image 30 is transparent.

Initially, the image 30 is digitized and stored in the memory of the computer 22 by any suitable means, such as the digital graphics pad 20, by direct creation on computer 22 using the CPU and a graphics program, by being input electronically from a network or other device via the modem 32, by input from the video 34 or a scanner 36 or any other suitable method. Once digitized, the image 30 can be stored in the memory of the computer 22 as a multiresolution image, which is an image having different resolutions in different places. Because the stored image 30 is a multiresolution image, it can be varied adaptively according to need.

The image 30 can be defined mathematically as the sum of piecewise-constant functions at different resolutions $2^j \times 2^j$. In this sense, the image 30 can have "infinite" resolution everywhere. A user zooming into the image 30 would see more detail as long as higher-resolution detail is present. For example, a user working with the image 30, as shown in FIG. 2B, can zoom into the image to display an even higher resolution image consisting mostly of the leg 19. With control device 38, higher and higher levels of resolution can be obtained by the user. However, once the highest resolution is exceeded, the pixels of the finest-resolution image will appear to grow as larger and larger constant-colored squares.

Figure 2A:
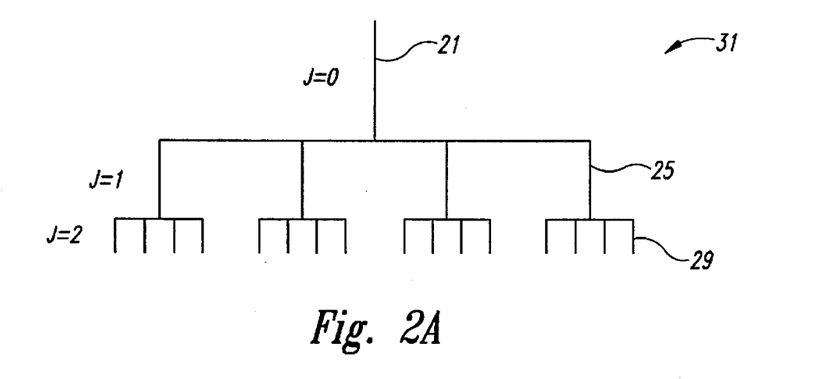
FIG. 2A shows the quadtree as used by the present invention and FIGS. 2B–2D show portions of an image corresponding to the quadtree.
Figure 2B:
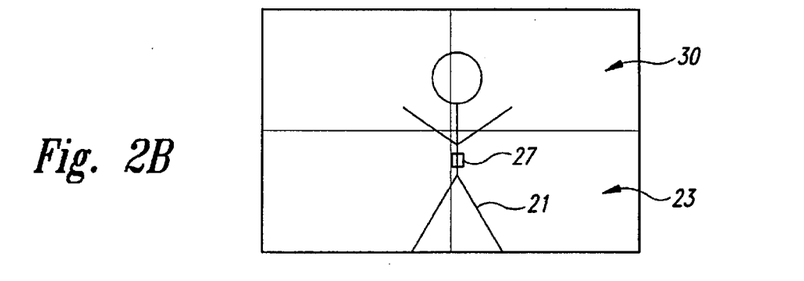
Figure 2C:
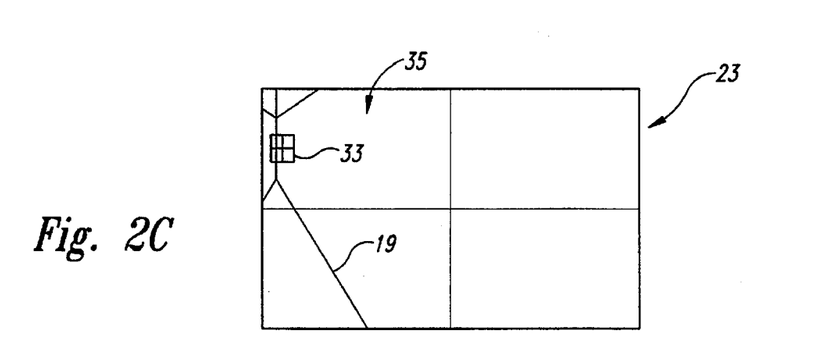
Figure 2D:
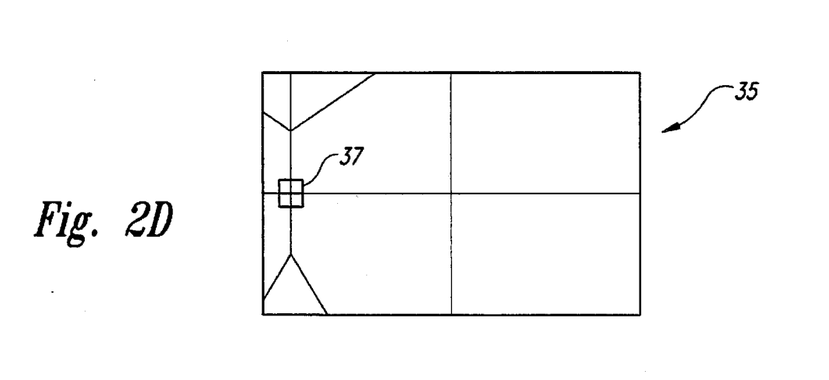

The representation of the multiresolution image 30 is stored in the memory of computer 22 as a sparse quadtree structure 31, as shown in FIG. 2A. The nodes of the quadtree structure 31 have a correspondence with the displayed pixels of the image 30. For example, the root 21 of quadtree structure 31 at level j=0, as shown in FIG. 2A, corresponds to a pixel 27 on the entire image 30 at the lowest resolution. Further, if area 23, as shown in FIG. 2B, represents a quarter of the image, then if the user zooms so area 23 fills the display 24, the children nodes 25 of the root 21 correspond to the four pixels 33 of the area 23, as shown in FIG. 2C. If the user zooms into area 35, which represents a quarter of the area 23, so that it fills in display 24, then the four pixels 37 correspond to the four children nodes 29 of node 25, as shown in FIG. 2D. Thus, each level j of quadtree 31, shown in FIG. 2A, corresponds to a scaled version of the multiresolution image 30 at resolution $2^j \times 2^j$. Note that, by the usual convention, "higher" levels of the quadtree (i.e., near the root 21) correspond to lower-resolution versions of the image, and vice versa.

Each node of the quadtree contains the following information described by the following pseudocode:

```
type QuadTreeNode = record
    d_i: array i ∈ [1, 3] of RGBA
    τ: real
    child[i]: array i ∈ [1, 4] of pointer to QuadTreeNode
end record.
```

The $d_i$ values in the QuadTreeNode structure describe how the colors of the child nodes deviate from the color of their parent node and are called the detail coefficients. These coefficients allow the computation of the RGBA colors of the four children, given the color of the parent. The $\alpha$ (opacity) component of a color c and detail coefficient $d_i$ are referred to as c.$\alpha$ and $d_i.\alpha$, respectively. Thus, the detail coefficients allow the computation of the colors of pixels 33 in FIG. 2C using the color of the pixel 27 in FIG. 2B, which correspond to node 25 and root 21, respectively.

The τ value represents the transparency of the node and can be used to simplify the extrapolation of various editing operations as will be discussed later. Here, the value τ is initialized to 1. The child[i] fields are pointers to the four children nodes. Since some of the children nodes may be null, the child[i] fields can alternatively be represented by a single pointer to an array of four children to optimize storage.

Each node N, for example node 29 in FIG. 2A, of the quadtree 31 corresponds to a particular region A(N) of the display 24, for example a corresponding one of the pixels 33 of FIG. 2C can be denoted by A(N). The value of A(N) is determined implicitly by the structure of the quadtree 31 and the particular view, and does not need to be represented explicitly in the actual node N.

In the present invention, which allows fractional-level zooming and editing, there does not need to be a one-to-one correspondence between the pixels on the display and the nodes at some level j in the quadtree. Thus, each node on the quadtree does not have to represent a pixel on the displayed image.

To accomplish fractional-level (i.e., continuous) zooming and editing, the square region A(N), corresponding to a given node N at level j in the quadtree, must be observed as to how it would grow as a user zooms in continuously from level j to j+1 to j+2. From such an observation it can be derived that the size of A(N) would increase exponentially from width 1 to 2 to 4 on the display 24. Thus, when displaying at a fractional level j+t, for some t between 0 and 1, A(N) should have size $2^t \times 2^t$.

On workstations that provide antialiased polygon drawing, fractional zooming is implemented by drawing each node as a single square of the proper fractional size. On less expensive workstations that support only integer-sized polygons efficiently, a slightly less efficient but still adequate display can be achieved by rounding each rendered square to the nearest pixel.

The quadtree itself is given by the pseudocode:

```
type QuadTree = record
    c: RGBA
    root: pointer to QuadTreeNode
end record
```

The c value in the quadtree structure Q supplies the color of the root node 21; it corresponds to an average of all the colors in the image 30.

The quadtree is sparse in that it contains no leaves (i.e., last set of nodes at highest level j) with detail coefficients $d_i$ that are all 0. Thus, the constant portions of the image at any particular resolution are represented implicitly. This convention allows the support of infinite resolutions in a finite structure. It also allows the explicit representation of high-resolution details only where they actually appear in the image.

Figure 3A:
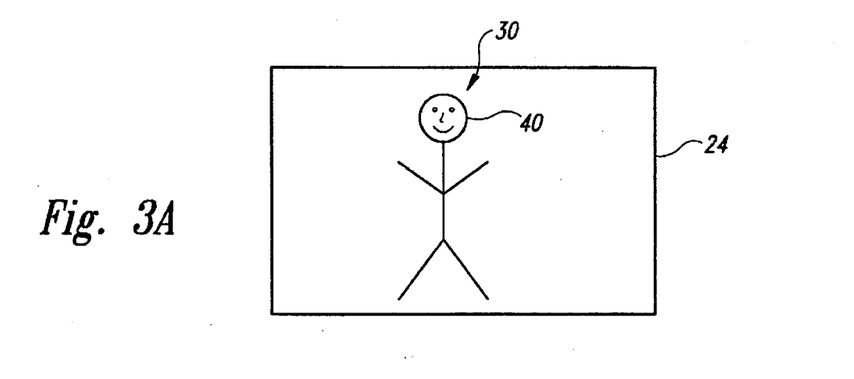
FIGS. 3A–3D show the process of fractional-level zooming in, editing, and panning out on an image.
Figure 3B:
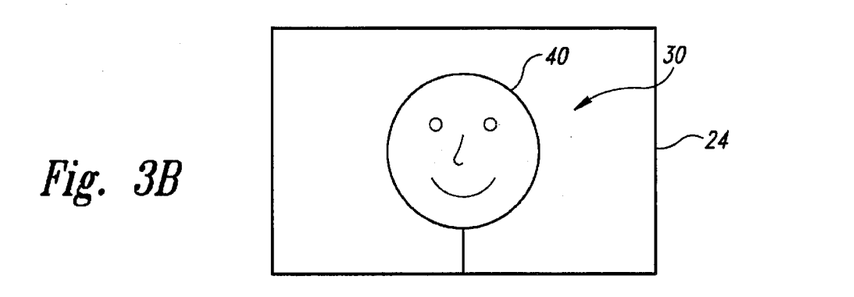
Figure 3C:
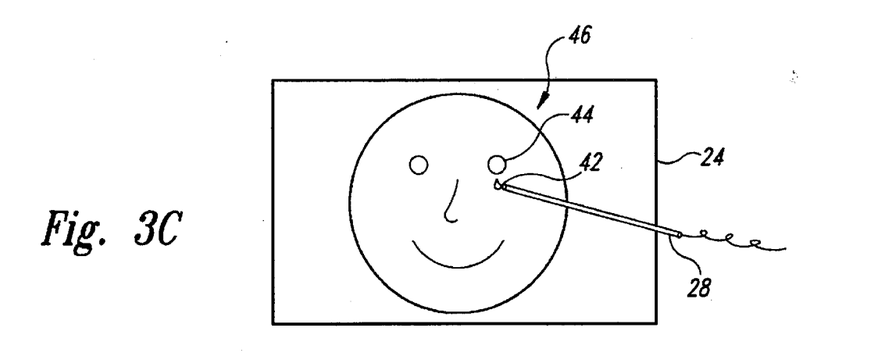
Figure 3D:
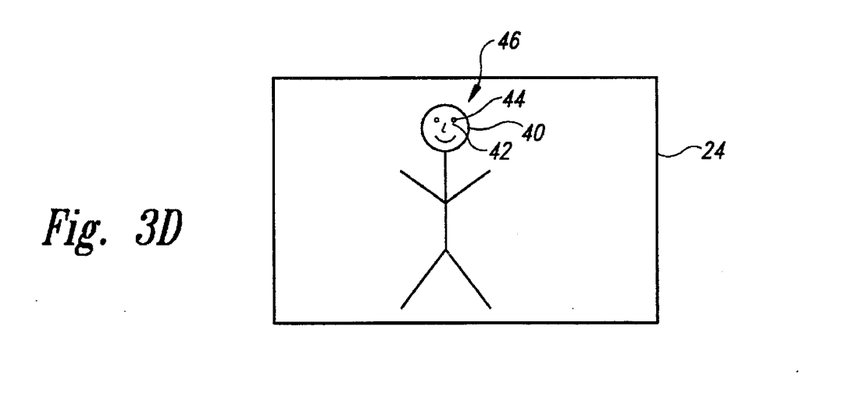

FIGS. 3A–3D show the process of fractional-level zooming in and then fractional-level editing a portion of image 30. Once the user has zoomed into a higher fractional-level resolution, shown in FIG. 3B, as discussed above, he can again use the zoom control device 38 to zoom into an even higher fractional-level resolution of a selected portion of the image 30. The selected portion, such as the head of the subject 40 in the image 30 can then be edited at that fractional level. For example, a teardrop 42 can be added below the left eye 44 with paintbrush 28 as shown in FIG. 3C. After the user edits the selected portion of the image 30, he can then pan out to a lower fractional-level resolution as shown in FIG. 3D.

After the multiresolution image 30 has been edited, it is updated to propagate the results of the editing operation to the rest of the multiresolution image, as represented by the quadtree 31. The update involves two steps: decomposition, in which the changes are propagated to all higher levels of the quadtree 31, that is, for example, changes to nodes 25 at level J=1 alter root 21 at level J=0, as shown in FIG. 2A; and extrapolation, in which changes are propagated to all the lower levels of the quadtree 31, that is, for example, changes at nodes 25 at level J=1 alter node 29 at level J=2, as shown in FIG. 2A. This updated version is then stored in the memory of computer 22. The updated version of the image 46, shown in FIG. 3D, can then be output by the visual display unit 24 or printed by the printer 35, as shown in FIG. 1.

These steps of displaying the image, painting the image, and then updating the image, as discussed above, can be implemented in the following manner.

In the first step of displaying the image 30 on the visual display unit 24 at any fractional level, an image of resolution $2^{j+t} \times 2^{j+t}$ is displayed by calling the following recursive Display routine once, which passes the color parent root to the overall quadtree:

```
procedure Display (N: QuadTreeNode; c : RGBA):
    c₁ ← c + d₁ + d₂ + d₃
    c₂ ← c − d₁ + d₂ − d₃
    c₃ ← c + d₁ − d₂ − d₃
    c₄ ← c − d₁ − d₂ + d₃
    for i ← 1 to 4 do
        if N is a leaf or N is at level j+t−1 then
            Draw cᵢ over the region A(child[i])
        else
            Display(child[i], cᵢ)
        end if
    end for
end procedure.
```

The pseudocode above recurses from the root 21 of FIG. 2A to level j+t−1 for the entire image; in reality, it should only recurse within the bounds of the portion of the image 30 that fits in the display window of display unit 24. Note that if m pixels are displayed, the entire display operation takes approximately $O(m)$ time. For this fractional-level display routine the recursion must be bottomed out whenever node N is at level [j+t−1]. Further, the region A (child[i]) must correspond to the appropriate fractional size. Finally, in this step a background buffer B, which represents the currently displayed image 30, is created.

The second step of fractional-level painting or editing is implemented by compositing a newly-painted foreground buffer F with the background buffer B to create a new resulting image R. Fractional-level painting or editing is supportable by updating the quadtree representation by first rescaling the buffer of newly painted changes F to the size of the next higher integer level, as if the user had painted the changes at level j+1; the scaling factor required is $2^{1-t}$. Then the same update as before can be performed, starting from level j+1. A discussion on the compositing algebra used to combine the newly painted foreground buffer with the background buffer can be found in Porter and Duff, "Compositing Digital Images," Proceedings of SIGGRAPH '84 (Minneapolis, Minn., Jul. 23–27, 1984), in *Computer Graphics* 18(3):253–259, 1984; and in the context of digital painting in Salesin and Barzel, "Two-Bit Graphics," *IEEE Computer Graphics and Applications* 6:36–42, 1986.

Figure 4A:
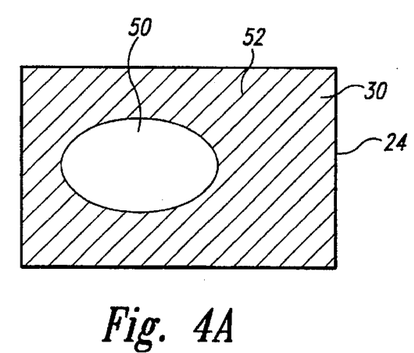
FIGS. 4A–4E show the use of different kinds of painting operations on an image.
Figure 4B:
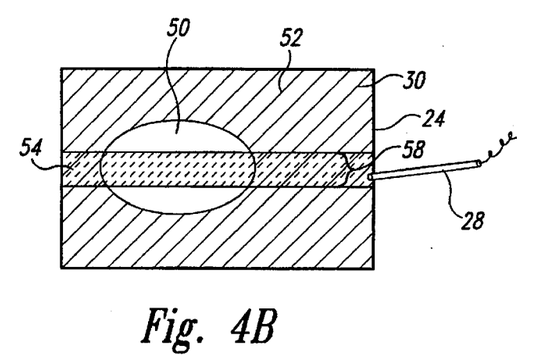
Figure 4C:
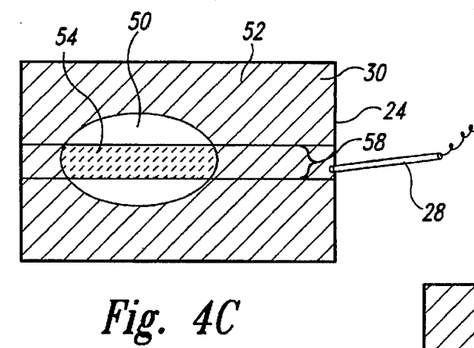
Figure 4D:
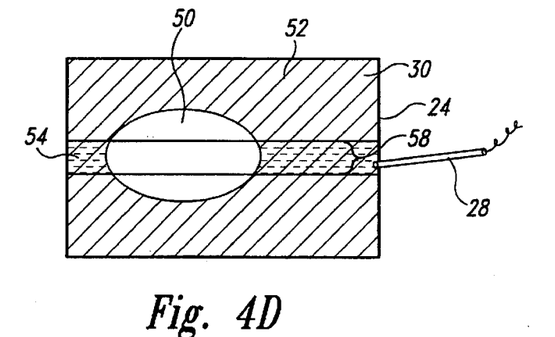
Figure 4E:
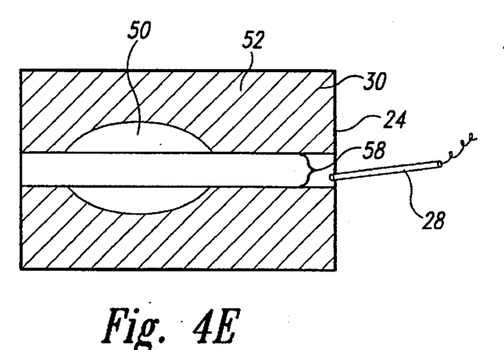

The step of fractional-level painting or editing an image supports several painting operations as shown in FIGS. 4A–4D. For example, if the image 30, as shown in FIG. 4A, has a clear or transparent area 50, and a painted area 52, then four distinct operations can be performed on this image. One of these operations is the "over" operation which places paint 54 on the image 30 everywhere along the path 58 of the paintbrush 28. Thus, both the painted area 52 and the clear area 50 are covered with paint 54, as shown in FIG. 4B. Another operation is the "under" operation, as shown in FIG. 4C. When performing an "under" operation, as a paintbrush 28 is moved along a path 58, the paint 54 is only applied on the clear or transparent area 50. None of the paint 54 is applied to the already painted background area 52 of the image. Yet another operation is the "in" operation, shown in FIG. 4D. For an "in" operation, when the paintbrush 28 is moved along the path 58, the paint 54 is only applied onto the painted area 52 along the path 58, and no paint is applied to the clear or transparent area 50 of the image 30. Finally, this step of fractional-level painting or editing also supports a unary "erase" operation, which removes paint from all of the background of the image 30. For example, when paintbrush 28 is moved along path 58, all the painted area 52 of image 30 is removed, as shown in FIG. 4E.

No special routines are required to implement fractional-level painting itself. One difference between conventional methods of painting and the present embodiment is that in addition to the composited resulting image R, a separate copy is kept of the foreground buffer F, which contains all of the newly applied paint. This foreground buffer F is necessary for updating the quadtree, as will be described. The process of painting proceeds until the user either changes the painting operation (for example, from "over" to "under"), or changes the display on display unit 24 by panning or zooming. Either of these operations triggers the third step of updating.

Finally, in the updating step for updating the necessary levels after the fractional-level editing has been performed, let j be the next higher level of the quadtree from the fractional-level at which the user has been painting, and $c_r(x,y)$ be the color of each modified pixel in the result image R. A decomposition of the entire image is performed by calling the following Decompose function once, passing the root of the quadtree Q.root as an argument, and storing the result in Q.c:

```
function Decompose(N : QuadTreeNode):
    if N is at level j then
        return c_r(x,y)
    end if
    for i ← 1 to 4 do
        cᵢ ← Decompose(child[i])
    end for
    d₁ ← (c₁ − c₂ + c₃ − c₄)/4
    d₂ ← (c₁ + c₂ − c₃ − c₄)/4
    d₃ ← (c₁ − c₂ − c₃ − c₄)/4
    return (c₁ + c₂ + c₃ + c₄)/4
end function.
```

The pseudocode above assumes that the sparse quadtree structure already contains all of the nodes corresponding to the pixels in the result image R; however, if R has been painted at a higher resolution than the existing image, then new nodes may have to be allocated and added to the quadtree structure as part of the traversal. Furthermore, for efficiency, the Decompose function should be modified to only recurse in regions of the multiresolution image where changes have actually been made. Thus, if the portion of the image being edited has m pixels, then the entire decomposition operation takes $O(m)$ time.

As can be inferred, the present invention is not limited to a standard wavelet basis, but instead uses a non-standard basis in a non-standard decomposition thereby reducing the complexity of the decomposition. For further discussion, see Stollitz et al., "Wavelets for Computer Graphics; A Primer,"

University of Washington, Department of Computer Science and Engineering, January, 1994, incorporated herein by reference.

Extrapolation is a bit more complicated, and depends on the particular compositing operation used. For binary painting operations, let $c_f(x,y)$ be the color of the foreground image F at each pixel (x,y), and let $c_f\alpha(x,y)$ be the pixel's alpha (opacity) value. For the "erase" operation, let $\delta(x,y)$ be the opacity of the eraser at each pixel. Extrapolation can then be performed by calling the following routine for the node N corresponding to each modified pixel (x,y) of the edited image:

```
procedure Extrapolate(N: QuadTreeNode)
    for i ← 1 to 3 do
        switch on the compositing operation
            case "over":
                d_i ← d_i * (1 − c_f α(x,y))
            case "under":
                d_i ← d_i − d_i α * c_f(x,y)
            case "in":
                d_i ← d_i * (1 − c_f α(x,y)) + d_i α * c_f(x,y)
            case "erase":
                d_i ← d_i * (1 − δ(x,y))
        end switch
    end for
    if N is not a leaf then
        for i ← 1 to 4 do
            Extrapolate(child[i])
        end for
    end if
end procedure.
```

The extrapolation procedure takes an amount of time proportional to the quantity of detail that appears further down the quadtree structure at higher resolutions of the modified parts of the image.

One novel aspect of the present invention is the capability to optimize and simplify this extrapolation operation, at least for the most common cases of painting "over" and erasing, by using a form of lazy evaluation. The two formulas for "over" and "erase" in the pseudocode above merely multiply the existing detail coefficients by some transparency constant, $\tau(x,y)$. (For painting "over," $\tau(x,y)=1-c_f\alpha(x,y)$; for erasing, $\tau(x,y)=1-\delta(x,y)$.) For these two operations, rather than calling the Extrapolate procedure for each node N, the value $N.\tau$ stored at the node can be multiplied by $\tau(x,y)$. Later, if and when the $d_i$ values for a node N are actually required, they can be lazily updated by multiplying each $N.d_i$ with the $\tau$ values of all of the node's ancestors (i.e., parents, grandparents up the tree). For a discussion on lazy evaluation see Perlin and Velho in "A Wavelet Representation for Unbounded Resolution Painting" Technical Report, New York University, November, 1992. The product of the transparency and the nodes ancestors is easily performed as part of the recursive evaluation. Thus, if nodes 25 are altered their values can be extrapolated to all the nodes 29, as shown in FIG. 2A, by multiplying their respective values by the $\tau(x,y)$ of corresponding nodes 25.

This unique and very simple form of lazy evaluation is a by-product of the underlying wavelet representation for the image, since the detail coefficients at higher resolutions, such as nodes 29, depend only on the product of the opacities of all the paint applied and removed at lower resolutions, such root 21 or node 25. Any sort of lazy evaluation method would be much more complicated with image pyramids, since the high-resolution colors have a much more complex dependence on the colors of the paint applied and removed at lower resolutions. Note also that color correction, an important image operation, is a special case of compositing "over," and so can be performed on an arbitrarily high-resolution image in time proportional only to the resolution actually displayed.

The above-mentioned equations used within the display, painting, and updating steps may be derived. For example, if $C^n$ is a matrix of size $2^n \times 2^n$ representing the pixel values of image 30, then it can be associated with a function $I^n(x,y)$ as follows:

$$I^n(x,y) = \Phi^n(y) C^n \Phi^n(x)^T,$$

where $\Phi^n(x)$ is a row matrix of basis functions $[\phi_1^n(x), \ldots, \phi_{2^n}^n(x)]$, called scaling functions. In this application, a Haar basis is used, where each scaling function $\phi_i^n(x)$ is given by:

$$\phi_i^n(x) = \left\{ \begin{array}{l} 1 \text{ for } 0 \leq 2^n x - i < 1 \\ 0 \text{ otherwise} \end{array} \right\}$$

The wavelet transform allows the decomposition of $C^n$ into a lower-resolution version $C^{n-1}$ and detail parts $D_1^{n-1}$, $D_2^{n-1}$, and $D_3^{n-1}$, by using matrix multiplication as follows:

$$C^{n-1} = A^n C^n (A^n)^T \quad (1)$$

$$D_1^{n-1} = A^n C^n (B^n)^T \quad (2)$$

$$D_2^{n-1} = B^n C^n (A^n)^T \quad (3)$$

$$D_3^{n-1} = B^n C^n (B^n)^T \quad (4)$$

In the Haar basis, the matrices $A^n$ and $B^n$ are given by:

$$A^n = \begin{bmatrix} 1/2 & 1/2 & 0 & 0 & \ldots & 0 \\ 0 & 0 & 1/2 & 1/2 & & \\ \cdot & \cdot & & & \cdot & \\ \cdot & \cdot & & & \cdot & \\ \cdot & \cdot & & & \cdot & \\ 0 & 0 & & & \ldots & 1/2 & 1/2 \end{bmatrix}$$

$$B^n = \begin{bmatrix} 1/2 & -1/2 & 0 & 0 & \ldots & 0 \\ 0 & 0 & 1/2 & -1/2 & & \\ \cdot & \cdot & & & \cdot & \\ \cdot & \cdot & & & \cdot & \\ \cdot & \cdot & & & \cdot & \\ 0 & 0 & & & \ldots & 1/2 & -1/2 \end{bmatrix}$$

The detail coefficients $d_j$ at level j in the algorithm are the entries of the $D_i^j$ matrix. Thus, equations (1)–(4) immediately above, provide the expressions used in the Decompose routine.

The four decomposed pieces can also be put back together again, using two new matrices $P^n$ and $Q^n$, as follows:

$$C^n = P^n C^{n-1} (P^n)^T + P^n D_1^{n-1} (Q^n)^T + Q^n D_2^{n-1} (P^n)^T + Q^n D_3^{n-1} (Q^n)^T$$

This equation provides the expressions used in the fractional-level Display routine. In the Haar basis, these matrices are given by $P^n = 2(A^n)^T$ and $Q^n = 2(B^n)^T$.

The original function $I^n(x,y)$ can be expressed in terms of the lower-resolution pixel values $C^{n-1}$ and detail coefficients $D_i^{n-1}$ using a new set of basis functions $\Psi^j = [\Psi_1^j(x), \ldots, \Psi_m^j(x)]$, called wavelets, as follows:

$$I^n(x,y) = \Phi^{n-1}(y)C^{n-1}\Phi^{n-1}(x)^T + \Phi^{(n-1)}(y)D_1^{n-1}\Psi^{n-1}(x)^T + \quad (5)$$
$$\Psi^{n-1}(y)D_2^{n-1}\Phi^{n-1}(x)^T + \Psi^{n-1}(y)D_3^{n-1}\Psi^{n-1}(x)^T.$$

In the Haar basis, there are $m=2^j$ wavelets in $\Psi^j$, and each $\Psi_i^j(x)$ is given by:

$$\psi_i^j(x) = \begin{cases} 1 & \text{for } 0 \leq 2^j x - i < 1/2 \\ -1 & \text{for } 1/2 \leq 2^j x - i < 1. \\ 0 & \text{otherwise} \end{cases}$$

Decomposing the first term $\Phi^{n-1}(y)C^{n-1}\Phi^{n-1}(x)^T$ of equation (5) recursively allows the representation of function $I^n(x,y)$ in its wavelet basis, given by the row matrix $$[\Phi^0|\Psi^0|\ldots|\Psi^{n-1}].$$

In order to derive the expressions used for compositing detail coefficients in the Extrapolate routine, compositing operations must be defined based on functions F, B, and R, built from the pixel values $C_f, C_b$, and $C_r$ of the foreground, background, and resulting images, respectively, such that:

$$F^j(x,y) = \Phi^j(y)C_f^j\Phi^j(x)^T$$
$$B^n(x,y) = \Phi^n(y)C_b^n\Phi^n(x)^T$$
$$R^n(x,y) = \Phi^n(y)C_r^n\Phi^n(x)^T.$$

The foreground image has its highest-resolution components in level j, the next level above the fractional-level at which the user is editing/painting, whereas the background and resulting images have components in a potentially higher-resolution level n. For example, the "over" operation can be defined on functions F, B, and R as follows:

$$R^n(x,y) = F^j(x,y) + (1 - F^j.\alpha(x,y))*B^n(x,y).$$

The expressions for compositing detail coefficients can be derived by writing each function in its wavelet basis, multiplying out, and regrouping terms. The final expressions are quite simple, as the pseudocode for the Extrapolate routine attests.

Treating boundary conditions correctly introduces a slight complication to the update and display algorithms previously described. The difficulty is that the Decompose function needs to have available to it the colors of the children of every node N that it traverses. For example, node 25 in FIG. 2A would require the colors of its children including node 29. However, some of these child nodes correspond to regions that are outside the boundary of the window in which the user has just painted, and therefore are not directly available to the routine. The obvious solution is to store color information, in addition to the detail coefficients, at every node of the quadtree; however, this approach would more than double the storage requirements of the quadtree, as well as introduce the extra overhead of maintaining redundant representations. Instead, a temporary auxiliary quadtree structure of just the colors necessary for the decomposition may be kept; this structure can be filled in during the Display operation at little extra cost in storage. The size of this auxiliary structure is just O(m).

Figure 5A:
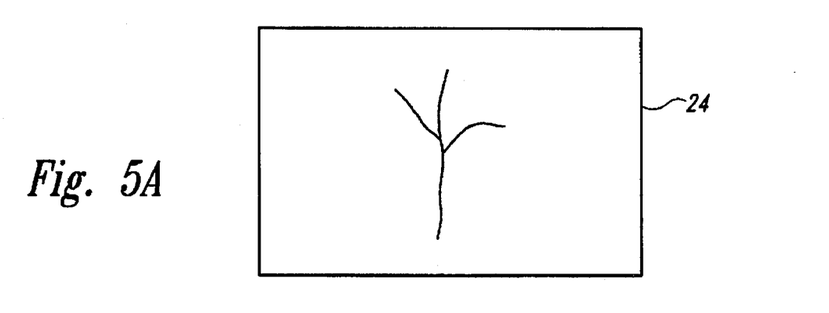
FIGS. 5A–5D show different fractional-levels of zooming and multiresolution painting at that fractional-level of zooming.
Figure 5B:
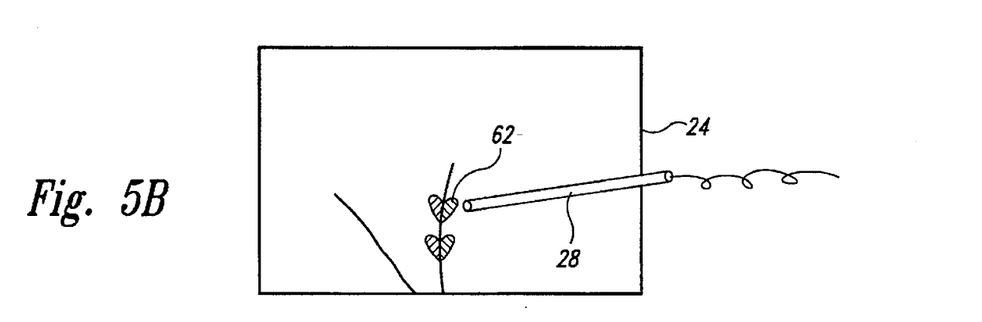
Figure 5C:
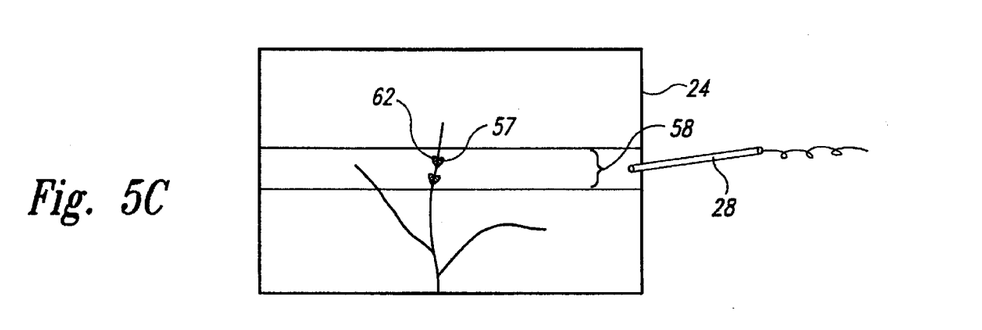
Figure 5D:
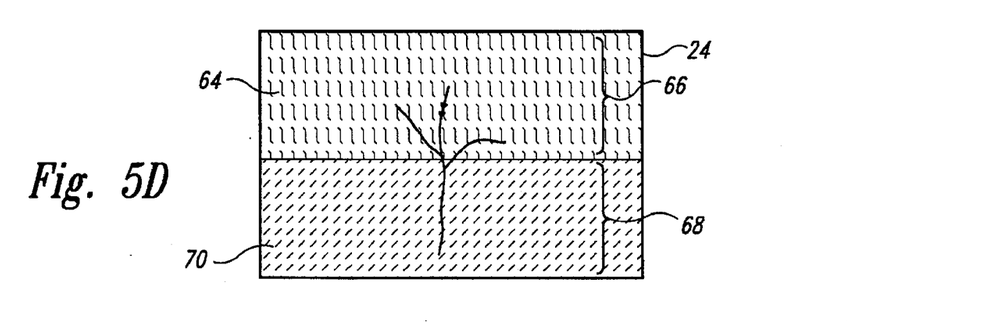

Another zooming and editing procedure that zooms and paints at a fractional-level resolution is shown in FIGS. 5A–5D. By allowing continuous zooming into the image 30, a tree 60, shown in FIG. 5A, can be drawn at a low resolution. Then, a user by controlling the zoom device 38, shown in FIG. 1, can zoom into the tree 60 at any area of the image 30 by any fractional-level resolution of the image. Once zoomed in, a user may add leaves 62 to the tree 60 with paintbrush 28, as shown in FIG. 5B. A user may then continuously zoom out to a lower resolution level, as shown in FIG. 5C, and sweep paintbrush 28 along a path 58 using an "in" operation, to apply paint 57 to only the areas previously painted, in this case the leaves. A user may then quickly zoom out to an even lower resolution and rough in the sky 64 with passes of the paintbrush 28 along path 66, and then move the pen 28 along path 68 at the bottom of image 30 to paint in grass 70, both using an "under" operation so the previously painted leaves and tree are not affected, as shown in FIG. 5D. Thus, an image may be edited or created at any scale quickly and efficiently.

Figure 6A:
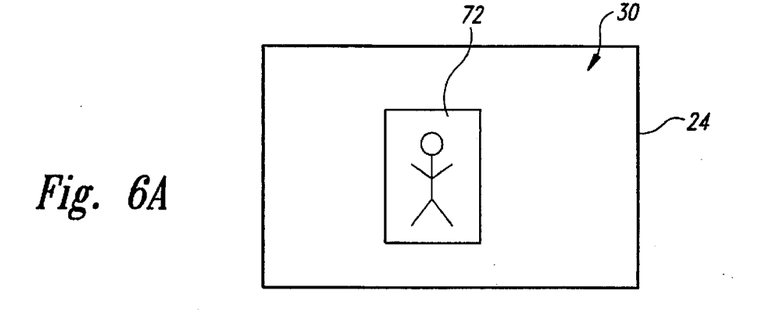
FIGS. 6A–6D show the manipulation of a single multiresolution image which is made from six successive images.
Figure 6B:
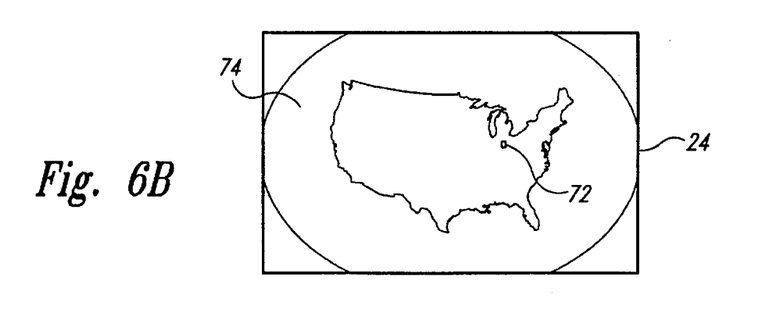
Figure 6C:
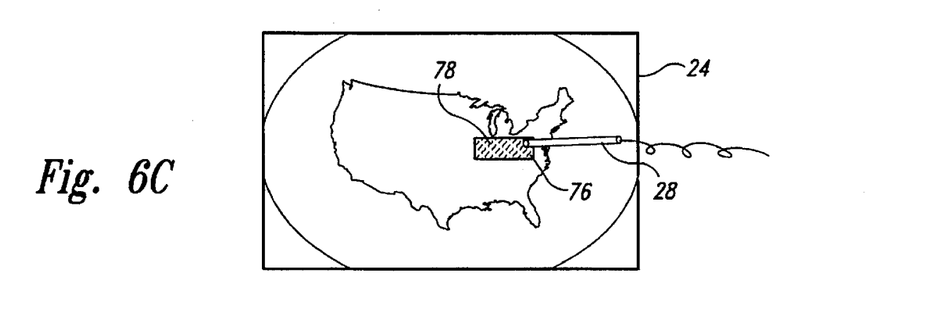
Figure 6D:
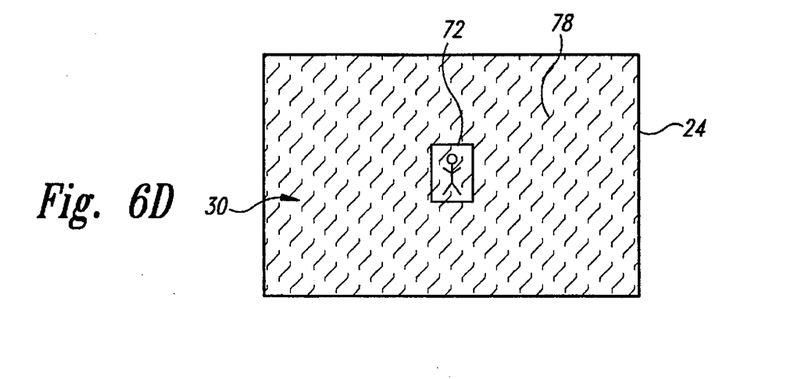

By allowing a user to zoom continuously into a multi-resolution image, the utilization and composition of successive images can be merged together. For example, a multi-resolution image can be made out of successive images from a book, such as *Powers of Ten*, by compositing its images together at different scales. In the book, each of the images is a 10x higher-resolution version of the central portion of its predecessor. Therefore, if six images are made into a single image 30, this image will have a $10^5$ range of scale. Further, with fractional-level editing available, each of the images from the book within image 30 can be manipulated. For example, FIG. 6A shows a simplification of one of the lower power successive images of the book. Here, the innermost detail is represented by a person lying on a blanket 72. A user could zoom out by a factor of 100,000 to an image of the continent and the planet 74, as shown in FIG. 6B. Then, as shown in FIG. 6C, the user could retouch the low resolution version of the image 30 using the "over" operation and a paintbrush 28 to create a smog-like effect 78 over the paintbrush path 76, which overlaps the higher resolution image of the person on the blanket 72. If the user then zooms into a higher level resolution, as shown in FIG. 6D, the person on the blanket 72 will be visible but slightly obfuscated by the smog created over path 76. Thus, the smog added over path 26 will affect all of the closer views without eliminating any of the detail present.

Accordingly, the present invention allows the fractional-level display and editing of images using multiresolution painting and compositing with the ability to make sweeping changes at a coarse resolution, as well as doing fine detail work at high resolutions, wherein a user can zoom into an image at an arbitrary resolution and to work at any convenient scale.

By zooming into an image and working at an arbitrary resolution, a user may work on a single image at any degree of resolution and not constrained to only operate at discrete levels of zooming in which the resolution doubles at each level. This enables operations like texture mapping, which allows portions of a texture that will be seen up close to be defined in more detail to be performed. Satellite and other image database formation, which allow overlapping images created at different resolutions to be coalesced into a single multiresolution image, are also possible with the present invention. Further, "importance-driven" physical simulations, which may be computed to different resolutions in different places, the use of virtual reality, hypermedia, and games, which allow for image detail to be explored interactively, by using essentially unlimited degrees of panning and zooming, and the use of an "infinite desktop" interface, which present a single virtual "desktop" with infinite resolution to the user, may all utilize the present invention.

While the foregoing has been a discussion of a specific embodiment of the present invention, those skilled in the art

11 will appreciate that numerous modifications to the disclosed embodiment can be made without departing from the spirit and scope of the invention. Accordingly, the invention is defined by the following claims.

We claim:

1. A method in a computer system of editing a single image having multiple discrete levels of resolution, said method comprising the steps of:

inputting data representing the image having multiple discrete levels of resolution;

displaying from the data at least a portion of the image at a selected non-integer fractional-level resolution, the fractional-level resolution capable of ranging continuously from one of the integer levels of resolution of the image to another one of the integer levels of resolution of the image;

editing a selected area of the image at the selected non-integer fractional-level resolution;

updating the image to create an edited version of the image;

storing the edited version of the image; and outputting the edited version of the image.

2. A method of editing according to claim 1 wherein said displaying step comprises zooming into a higher resolution of the image.

3. A method of editing according to claim 1 wherein said displaying step comprises zooming out to a lower resolution of the image.

4. A method of editing according to claim 1 wherein said step of storing the edited version comprises storing only detail present at the selected resolution.

5. A method of editing according to claim 1 wherein said editing step comprises removing paint from the image.

6. A method of editing according to claim 1 wherein said editing step comprises placing paint on the image wherever it is applied by a user.

7. A method of editing according to claim 1 wherein said editing step comprises placing paint on the image in locations only where it is applied by a user and where the image has previously been painted.

8. A method of editing according to claim 1 wherein said editing step comprises placing paint on the image in locations only where it is applied by a user and where the image is transparent.

9. A method of editing according to claim 1, further comprising storing the image in a background buffer before said editing step.

10. A method of editing according to claim 9, further comprising storing in a foreground buffer all changes made in said editing step.

11. A method of editing according to claim 1 wherein the data representing the image is stored according to a non-standard wavelet decomposition in a Haar basis.

12. A method in a computer system of editing an image having discrete levels of resolution, said method comprising the steps of:

inputting data representing the image having discrete levels of resolution;

displaying from the data at least a portion of the image at a selected fractional-level resolution, the fractional level resolution capable of ranging continuously from one of the levels of resolution of the image to another one of the levels of resolution of the image;

storing the image in a background buffer;

editing a selected area of the image at the fractional-level resolution;

12 storing in a foreground buffer all changes made in the editing step;

updating the image to create an edited version of the image by rescaling the changes stored in the foreground buffer at the fractional-level resolution to a next highest discrete level of resolution;

storing the edited version of the image; and outputting the edited version of the image.

13. A method of editing according to claim 12, further comprising the step of compositing the foreground buffer with the background buffer to create a composited image.

14. A method of editing according to claim 13 wherein said updating step further comprises the step of propagating the composited image to the different levels of resolution.

15. A method of editing according to claim 14 wherein said propagating step further comprises the steps of decomposing the composited image to a lower level of resolution and extrapolating the composited image to a higher level of resolution.

16. A method of editing according to claim 15 wherein said step of extrapolating the composited image is performed using a lazy evaluation.

17. A method of editing according to claim 16 wherein said step of extrapolation further comprises multiplying a transparency of a next lower resolution to obtain a transparency of the next higher resolution.

18. An apparatus for editing a single image having different discrete levels of resolution, said apparatus comprising:

a data input device that inputs data representing the image;

a zooming control device which selects a resolution from a non-integer fractional-level of resolution between one of the discrete levels of resolution of the image and another one of the discrete levels of resolution of the image;

an editing device that edits a selected area of the image at the non-integer fractional-level of resolution to create an edited version of the image;

a storage device which retains the edited version of the image; and a display device which displays at least one of the image and the edited version of the image.

19. An apparatus according to claim 18 wherein said zooming control device is capable of zooming in to a higher resolution and zooming out to a lower resolution of the image.

20. A method in a computer system of editing an image having a discrete number of resolution levels, the image having a representation as a quadtree structure with a plurality of nodes, each node having a transparency and a detail coefficient, where each of the levels of resolution is denoted by a level of the quadtree structure, the method comprising the steps of:

inputting into a background buffer a representation of the image at a fractional-level of resolution between two of the discrete levels of resolution;

editing at least a portion of the image stored in the background buffer;

storing in a foreground buffer a representation of changes made during the editing step;

changing the transparency of a portion of the plurality of nodes in accordance with the editing step to create edited nodes at a designated one of the discrete number of resolution levels;

compositing the foreground buffer with the background buffer to create a composited image; and extrapolating the composited image from the designated one of the resolution levels to a higher one of the resolution levels by multiplying the detail coefficient of at least one node at the higher level of resolution with the transparency of an edited node.

21. A method of editing according to claim 20 wherein said editing step comprises removing paint from the image.

22. A method of editing according to claim 20 wherein said editing step comprises placing paint on the image wherever it is applied by a user.

23. A method of editing according to claim 20 wherein said compositing step comprises the step of retaining the foreground buffer.

24. A method of editing according to claim 20 wherein said step of extrapolating is performed using a non-standard wavelet decomposition in a Haar basis.

25. A method in a computer system of painting a digital image having different resolutions in different parts of the image, the method comprising the steps of:

storing the image in a multiresolution data structure with data stored at different levels of resolution;

displaying a representation of the image at a fractional resolution between two of the different levels of resolutions;

editing the displayed image by at least one of applying paint to the image and removing paint from the image, thereby producing a resulting image; and updating the stored image based upon the editing step by decomposing the resulting image to a lower level of resolution; and extrapolating the resulting image to a higher level of resolution.

26. The method of claim 25 wherein the stored image is represented using wavelet representations and the updating step recomputes the wavelet representations of portions of the stored image that have been modified by the editing step.

27. The method of claim 26 wherein the wavelet representations use a Haar basis.

28. A computer-readable memory containing instructions for controlling a computer processor in a computer system to edit a single image having multiple discrete levels of resolution by performing the steps of:

inputting data representing the image having multiple discrete levels of resolution;

displaying from the data at least a portion of the image at a selected non-integer fractional-level resolution, the fractional-level resolution capable of ranging continuously from one of the integer levels of resolution of the image to another one of the integer levels of resolution of the image;

editing a selected area of the image at the selected non-integer fractional-level resolution;

updating the image to create an edited version of the image;

storing the edited version of the image; and outputting the edited version of the image.

29. The computer-readable memory of claim 28 wherein the image representation uses a wavelet representation to represent the data at each level of resolution.

30. The computer-readable memory of claim 28 wherein the image representation is constructed according to a non-standard wavelet decomposition in a Haar basis.

* * * * *